UNITED STATES PATENT OFFICE.

CAMPBELL C. CARPENTER, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

PASTE FOR STORAGE-BATTERY PLATES.

1,215,907.  Specification of Letters Patent.  Patented Feb. 13, 1917.

No Drawing.  Application filed May 18, 1912. Serial No. 698,227.

*To all whom it may concern:*

Be it known that I, CAMPBELL C. CARPENTER, a citizen of the United States, residing at Niagara Falls, in the county of Niagara and State of New York, have invented new and useful Improvements in Pastes for Storage-Battery Plates, of which the following is a full, clear, concise, and exact description.

My invention relates to storage battery plates of the pasted type.

The object of my invention is to increase the life and maintain the capacity of pasted plates.

Pasted plates, both positive and negative, have been made heretofore by filling a frame or grid with a mixture of lead oxid and salts, this mixture being known as the "paste." Various salts have been used, among them ammonium sulfate and magnesium sulfate. The plate, after being pasted, is subjected to an electrolytic bath, whereby the oxid of lead is converted either to peroxid of lead or sponge lead, depending upon whether the plate is to be used as a positive or negative electrode. During the forming process the salts are dissolved out of the mass, leaving small interstices or pores between the particles of the lead peroxid or the lead sponge.

The salts are added to the oxids in order to reduce the given weight of a volume of oxid and to render the same porous, thereby reducing the amount of oxid required for a given plate and giving a plate of high capacity. The salts also act as a setting agent, causing a rapid setting of the paste when applied to the grid. If the battery grid were pasted with the ordinary oxid of lead used commercially, without the addition of salts, a plate of very low capacity would be obtained, due to the very great mass of material in the grid, and due to the lack of porosity. Such a plate, furthermore, would be so heavy that its selling cost would be proportionately great, rendering it undesirable from a commercial standpoint, and furthermore, with so great a mass of material, the grid could not withstand the pressure exerted by the expansion of the material. Accordingly, the plate would disintegrate rapidly in service.

Salts are more or less detrimental to the action of a battery plate, as it is difficult, if not impossible, from a practical commercial standpoint to free a plate entirely from salts when they are used in the manufacture of the plate. Salt shows solvent action upon lead compounds, and this solvent action becomes more apparent when a battery has been in service for some time. This effect is usually represented by bursting of the grids and a general disintegration of the whole mass. Furthermore, it has been found that a paste with a setting agent incorporated therein is disadvantageous when the grids are hand pasted and practically unusable when pasting machines are employed. Heretofore, in practice, however, it has been considered essential to employ salts or other setting agents, in the paste composition.

In accordance with my invention, I mix with the ordinary commercial weight oxid of lead, a lighter oxid of lead, and thereby by the addition of water to moisten the mixture form a suitable paste having the proper physical characteristics, but without the use of salts or other setting agent. For this mixture I preferably employ the commercial crystalline orthorombic octahedron yellow oxid, which weighs about thirty-two grams per cubic inch, together with the amorphous yellow oxid, weighing about seven grams per cubic inch. These oxids have the same chemical composition, $PbO$, but differ in their weight per volume and in that the former is a heavy crystalline body while the latter is a feathery, light substance. A mixture of these oxids, preferably consisting of approximately equal volumes of each, will form a paste of the desired lightness, which is readily penetrated by the electrolyte, and which may be easily pasted into suitable frames, grids or other supports and subjected to the forming process.

The amorphous oxid is much more active chemically than the crystalline. It has the property of instantly combining with the sulfuric acid, while the crystalline form is sluggish in its action with sulfuric acid. As the energy obtained from the battery is in part proportional to the speed and readiness with which the oxid of the plate combines with the sulfuric acid, the presence of the amorphous oxid permits a quick chemical action in the plate and, consequently, produces a larger capacity than when the crystalline oxid alone is used.

Furthermore, the amorphous oxid has no detrimental effect such as results from the use of salts, so that not only is the initial capacity obtained, but the capacity is more readily maintained.

By varying the proportions, the general characteristics of the battery plate may be readily controlled without resorting to the use of undesirable foreign substances.

What I claim as new and desire to secure by Letters Patent of the United States is:

1. A paste for storage batteries consisting solely of a mixture of a heavy and a light oxid of lead.

2. A paste mixture for batteries comprising untreated oxids of lead of different relative weights.

3. A paste for batteries comprising solely lead oxid of normal weight having lead oxid of less relative weight mixed therewith to decrease the weight of the resulting mixture.

4. A mixture adapted to be "formed" as active material for battery plates, consisting solely of oxid of lead weighing approximately 32 grams per cubic inch and oxid of lead weighing approximately 7 grams per cubic inch.

5. A battery plate having active material which has been formed solely from lead oxid of normal weight having lead oxid of less weight mixed therewith to facilitate the penetration of the active material by the electrolyte.

6. A paste for storage batteries consisting solely of a mixture of crystalline PbO and amorphous PbO.

7. A paste for battery plates consisting solely of crystalline PbO mixed with a lead oxid of less weight per unit of volume.

In witness whereof, I have hereunto subscribed my name in the presence of two witnesses.

CAMPBELL C. CARPENTER.

Witnesses:
E. J. HANNIG,
F. J. CALLAHAN.